United States Patent
Duron et al.

(10) Patent No.: US 9,043,654 B2
(45) Date of Patent: May 26, 2015

(54) AVOIDING PROCESSING FLAWS IN A COMPUTER PROCESSOR TRIGGERED BY A PREDETERMINED SEQUENCE OF HARDWARE EVENTS

(71) Applicant: International Business Machines Corporation, Armonk, NY (US)

(72) Inventors: Mike C. Duron, Pflugerville, TX (US); Mark D. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/708,881

(22) Filed: Dec. 7, 2012

(65) Prior Publication Data

US 2014/0164850 A1    Jun. 12, 2014

(51) Int. Cl.
  *G06F 11/00* (2006.01)
  *G06F 11/30* (2006.01)
  *G06F 11/14* (2006.01)
  *G06F 11/07* (2006.01)
  *G06F 11/28* (2006.01)

(52) U.S. Cl.
  CPC ............ *G06F 11/3024* (2013.01); *G06F 11/30* (2013.01); *G06F 11/1441* (2013.01); *G06F 11/0778* (2013.01); *G06F 11/1417* (2013.01); *G06F 11/28* (2013.01)

(58) Field of Classification Search
  CPC .. G06F 11/0778; G06F 11/1441; G06F 11/30
  See application file for complete search history.

(56) References Cited

U.S. PATENT DOCUMENTS

| | | | |
|---|---|---|---|
| 7,185,331 B2 | 2/2007 | Talati et al. | 717/168 |
| 7,290,175 B1* | 10/2007 | Kessler et al. | 714/37 |
| 7,370,243 B1 | 5/2008 | Grohoski et al. | 714/48 |
| 7,590,875 B2* | 9/2009 | Therene et al. | 713/300 |
| 7,631,190 B2* | 12/2009 | Walmsley | 713/176 |
| 7,716,528 B2 | 5/2010 | Hayem | 714/30 |
| 7,734,949 B2 | 6/2010 | Koktan et al. | 714/5 |
| 7,895,426 B2 | 2/2011 | Holm et al. | 713/1 |
| 8,060,778 B2* | 11/2011 | Hara | 714/10 |
| 8,352,646 B2* | 1/2013 | Cox et al. | 710/23 |
| 8,606,998 B2* | 12/2013 | Zulauf | 711/125 |
| 2006/0184770 A1 | 8/2006 | Bishop et al. | 712/216 |
| 2006/0184771 A1 | 8/2006 | Floyd et al. | 712/218 |
| 2013/0019133 A1* | 1/2013 | Zhang et al. | 714/721 |
| 2013/0031419 A1* | 1/2013 | Haverkamp et al. | 714/45 |
| 2013/0275813 A1* | 10/2013 | Loganathan et al. | 714/47.1 |

OTHER PUBLICATIONS

Sarangi et al., "Patching Processor Design Errors with Programmable Hardware," IEEE Micro, 2007, pp. 1-14.

* cited by examiner

*Primary Examiner* — Charles Ehne
(74) *Attorney, Agent, or Firm* — Ido Tuchman

(57) ABSTRACT

A system, method and computer program product for avoiding a processing flaw in a computer processor triggered by a predetermined sequence of hardware events. The system may include a detecting unit and a power-on reset unit. The detecting unit detects that the predetermined sequence of hardware events is going to occur at the computer processor. The power-on reset unit initializes the computer processor to a state stored in computer memory in response to detecting the sequence of hardware events.

22 Claims, 3 Drawing Sheets

AVOIDING PROCESSING FLAWS IN A COMPUTER PROCESSOR TRIGGERED BY A PREDETERMINED SEQUENCE OF HARDWARE EVENTS

BACKGROUND

This invention relates to computer processor performance and more particularly to a system and method for avoiding processing flaws in a computer processor.

An increase in functionality for modern day microprocessors has led to more complex processor designs and architectural features. The added complexity may cause the microprocessors to be more susceptible to design flaws. For economic and manufacturing reasons, such design flaws cannot all be fixed through hardware so it is desirable to build a microprocessor that can avoid the flaw through built-in functions. Prior art solutions have failed to fully address the problem of avoiding conditions that cause a processing flaw on a processor.

BRIEF SUMMARY

Accordingly, one example aspect of the present invention is a method of avoiding a processing flaw in a computer processor triggered by a predetermined sequence of hardware events. The method includes a detecting step for detecting that the predetermined sequence of hardware events is going to occur at the computer processor. A performing step performs a first power-on reset procedure by the computer processor. The computer processor initializes to a first state stored in computer memory in response to detecting the sequence of hardware events.

Another example of the present invention is a system for avoiding a processing flaw in a computer processor triggered by a predetermined sequence of hardware events. The system includes a detecting unit and a power-on reset unit. The detecting unit determines that the predetermined sequence of hardware events is going to occur at the computer processor. The power-on reset unit is to initialize the computer processor to a first state stored in computer memory in response to detecting the sequence of hardware events while power is maintained at the computer processor.

Yet another example of the present invention is a computer program product for avoiding a processing flaw in a computer processor triggered by a predetermined sequence of hardware events. The computer program product includes computer readable program code configured to: detect that the predetermined sequence of hardware events is going to occur at the computer processor; and perform a first power-on reset procedure by the computer processor such that the computer processor is initializing to a first state stored in computer memory in response to detecting the sequence of hardware events.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
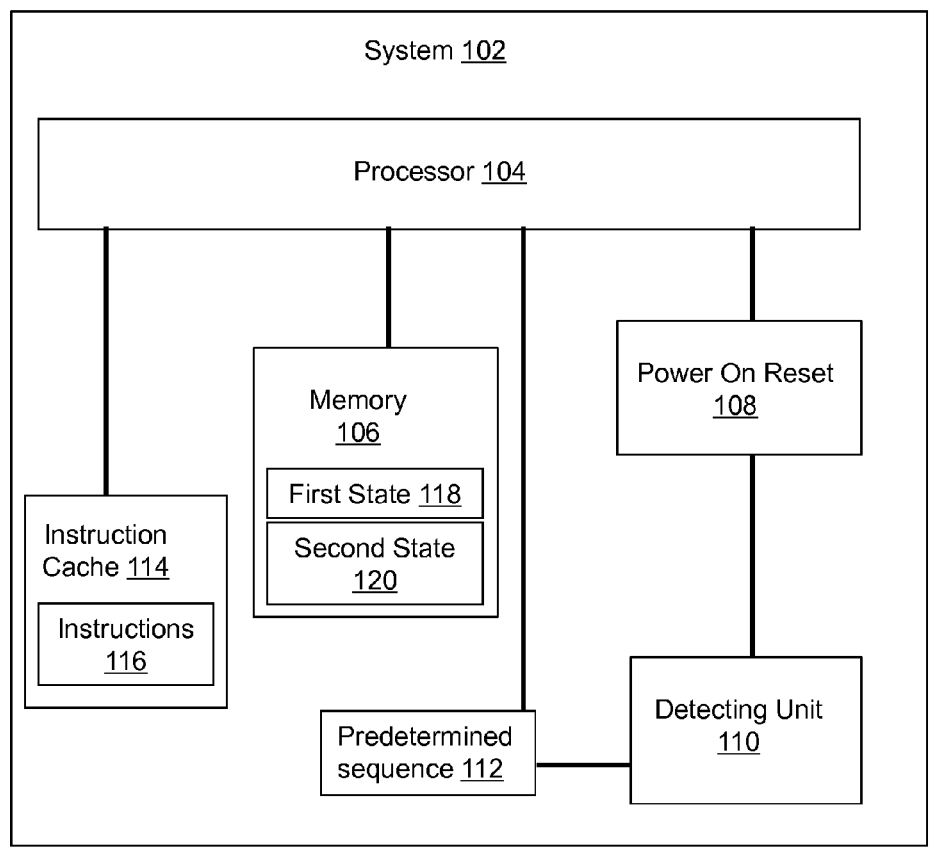
FIG. 1 shows a system for avoiding a processing flaw in a computer processor triggered by a predetermined sequence of hardware events in accordance with one embodiment of the invention.

The present invention is described with reference to embodiments of the invention. Throughout the description of the invention reference is made to FIGS. 1-3. When referring to the figures, like structures and elements shown throughout are indicated with like reference numerals.

FIG. 1 shows a system 102 for avoiding a processing flaw in a computer processor 104 triggered by a predetermined sequence of hardware events 112 according to one embodiment of the present invention. The system 102 includes a detecting unit 110 and a power-on reset unit 108.

The detecting unit 110 determines that the predetermined sequence of hardware events 112 is going to occur at the computer processor 104. The power-on reset unit 108 initializes the computer processor 104 to a first state 118 stored in computer memory 106. The power-on reset unit 108 initializes in response to detecting the sequence of hardware events 112 while power is maintained at the computer processor 104. The power-on reset unit 108 allows the computer processor 104 to initialize itself when coming out of a low power mode. The power-on reset 108 can also be used to reinitialize the chip with new settings.

The system 102 may include an instruction cache 114 containing computer instructions 116 to be executed by the computer processor 104. Further including, determining that the predetermined sequence of hardware events 112 is going to occur at the computer processor 104 includes detecting that a particular sequence of computer instructions 116 is loaded at the instruction cache 114.

In one embodiment, the computer processor 104 initializes to the first state 118 by clearing an instruction cache 114 of the computer processor 104. In another embodiment, the computer processor 104 initializes to the first state 118 by changing an operating frequency of the computer processor 104. In a further embodiment, the computer processor 104 initializes to the first state 118 by changing a depth of an instruction cache 114 of the computer processor 104.

The system 102 may include the detecting unit 110 that is further configured to determine if the predetermined sequence of hardware events 112 is going to occur at the computer processor 104 after initializing the computer processor 104 to the first state 118. Furthermore, the power-on reset unit 108 can be configured to initialize the computer processor 104 to a second state 120 stored in computer memory 106. The computer processor 104 can initialize to the second state 120 if the predetermined sequence of hardware events 112 is no longer going to occur at the computer processor 104 after initializing the computer processor 104 to the first state 118. The second state 120 being a state of the computer processor 104 prior to initializing the computer processor 104 to the first state 118.

In one embodiment, initializing the computer processor 104 to the second state 120 includes loading the second state 120 from the computer memory 106.

In one embodiment, it may not be desired to run the system 102 in the second state 120 all the time and the computer processor 104 can be initialized again with the original settings after the sequence is complete.

In one embodiment, the detecting unit 110 utilizes a workaround trigger (WAT) in the processor 104 to detect when a condition that will expose a logic bug or hang condition is about to occur. Instead of just flushing the instructions and trying again, the system, in one configuration, reinitializes the processor 104 and loads new register settings in order to work around the logic bug. It may not be desirable to have these settings on all the time, so the system can apply and remove the workaround settings as necessary. This can be done without rebooting the system 104 and with only a small performance penalty.

The power-on reset unit 108 allows the chip to initialize itself when coming out of a low power mode. This is typically used for power savings on the system. It can also be used to reinitialize the chip with new settings. The system 102 loads the new settings into L2 cache, then the chip is put through the power-on-reset procedure where it loads the settings from the L2 cache and starts instructions.

If the WAT mechanism detects a sequence of instructions or data that will cause a problem due to a known logic bug, the system can use the power-on reset unit 108 to load new chip settings to work around the problem. If it is not desired to continue execution of instructions with the workaround, the chip can be initialized again with the original settings after the sequence is complete.

Embodiments of the present invention can correct for processor logic bugs for which there may not be a centralized control workaround and for the case where the bug is in the centralized control logic. Embodiments of the present invention can also address the situation where there is no software workaround available or when it is not possible to use checkpoint and recovery.

For example, on an IBM POWER4 processor, a workaround may require setting the cache depth to 4 rather than 32. For performance reasons this may not be the desired setting. Once the situation requiring the workaround ceases to exist the power-on reset unit 108 can load the original setting and continue with the preferred settings. Furthermore, the workaround is performed during runtime without the need to reboot the operating system or system.

Other embodiments may use the work-around to adjust the energy scale mode, speed settings, processor frequency, memory controller, and other initialization settings for every mode the processor may be in. The embodiments would adjust detection according to the logic bug generated and may prevent checkstopping the core or the system.

While the workaround adjusts the processor that detected the bug, other processors will continue executing non-harmful instructions to ensure a different sequence of instructions will execute and the system will not have to restart and take the chance of encountering the logic bug again. Thus, the system may work on single and multicore processors and can change the initialization values on the fly.

Figure 2:
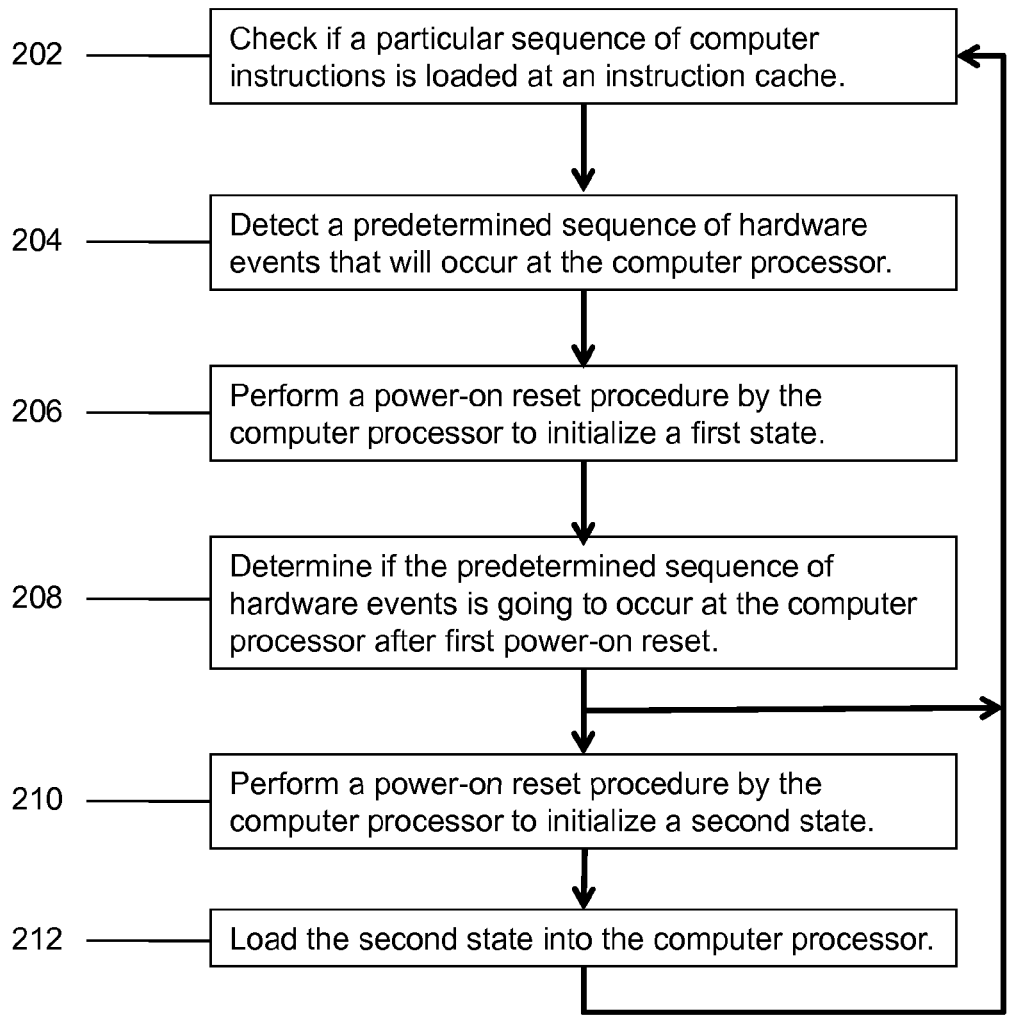
FIG. 2 shows the method of avoiding a processing flaw in a computer processor triggered by a predetermined sequence of hardware events in accordance with one embodiment of the present invention.

FIG. 2 shows the method of avoiding a processing flaw in a computer processor triggered by a predetermined sequence of hardware events in accordance with one embodiment of the present invention. The method includes a checking step 202. During the checking step 202, a particular sequence of computer instructions is checked for whether it is loaded at an instruction cache of the computer processor. After the checking step 202, the method continues to the detecting step 204.

At the detecting step 204, the predetermined sequence of hardware events is detected to occur at the computer processor. The detecting step 204 may include a predetermined sequence of hardware events that is an order of hardware events that are known to harm the efficiency or speed of the computer processor. The detecting step may also include a predetermined sequence of hardware events that is a sequence of hardware events that are known to require large amounts of memory. After the detecting step 204, the method continues to the performing step 206.

At the performing step 206, the first power-on reset procedure is performed by the computer processor. The computer processor is initialized to a first state stored in computer memory in response to detecting the sequence of hardware events. Alternatively, the performing step 206 may include the first power-on reset procedure clearing an instruction cache of the computer processor. The performing step 206 may also include the first power-on reset procedure changing an operating frequency of the computer processor. The performing step 206 may further include the first power-on reset procedure changing a depth of an instruction cache of the computer processor. After the performing step 206, the method continues to the determining step 208.

At the determining step 208, it is determined that the predetermined sequence of hardware events is going to occur at the computer processor after performing the first power-on reset procedure. If the predetermined sequence of hardware events is no longer going to occur at the computer processor after determining state 206, the method continues to the performing step 210.

At the performing step 210, a second power-on reset procedure is performed such that the computer processor is initialized to a second state. The second state being a state of the computer processor prior to performing the first power-on reset procedure. After the performing step 210, the method continues to the loading step 212.

At the loading step 212, the second state from the computer memory is loaded into the computer processor. After the loading step 212, the method returns to the checking step 202 and begins again.

Figure 3:
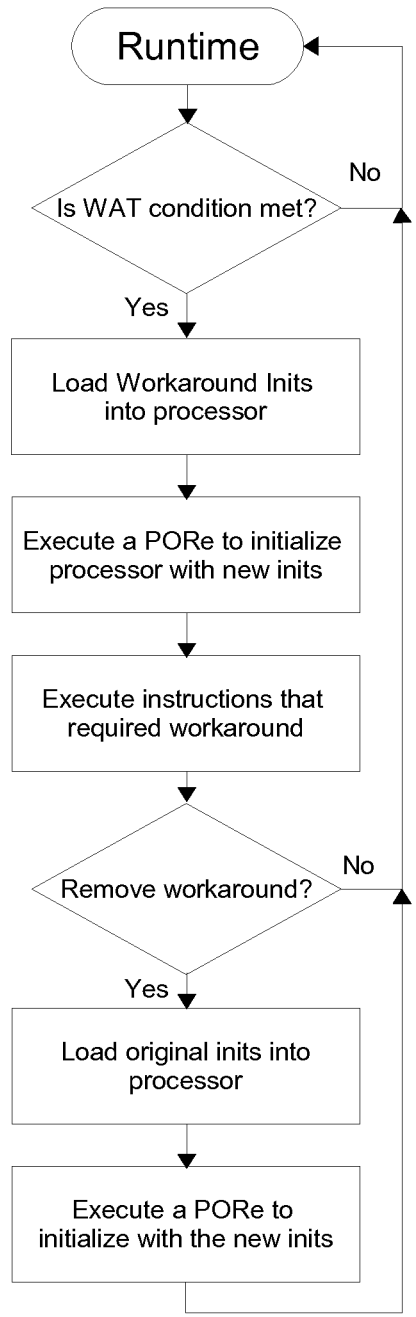
FIG. 3 shows another embodiment of a system for avoiding a processing flaw in a computer processor that is contemplated by the invention.

FIG. 3 shows another embodiment of a system for avoiding a processing flaw in a computer processor that is contemplated by the invention. Accordingly, this embodiment of the invention is to use a predetermined sequence of hardware events (work-around-trigger) to trigger the processor to detect when a condition that will expose a logic bug or hang condition is about to occur. Instead of flushing the instructions and trying again, one embodiment will reinitialize the processor and load new register settings to avoid the logic bug. It may not be desirable to have these settings on all the time, so the system can apply and remove the avoidance settings when it wants.

The method may run during runtime without the need to reboot the OS or system and may run on single or multicore processors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of avoiding a processing flaw in a computer processor triggered by a predetermined sequence of hardware events, the method comprising:
    detecting that the predetermined sequence of hardware events is going to occur at the computer processor;
    performing a first power-on reset procedure by the computer processor such that the computer processor is initializing to a first state stored in computer memory in response to detecting the sequence of hardware events; and
    checking if a particular sequence of computer instructions is loaded at an instruction cache of the computer processor; and
    wherein detecting that the predetermined sequence of hardware events is going to occur at the computer processor includes detecting that the particular sequence of computer instructions is going to be executed by the computer processor.

2. The method of claim 1, further comprising:
    determining if the predetermined sequence of hardware events is going to occur at the computer processor after performing the first power-on reset procedure; and if the predetermined sequence of hardware events is no longer going to occur at the computer processor after performing the first power-on reset procedure, performing a second power-on reset procedure such that the computer processor is initializing to a second state, the second state being a state of the computer processor prior to performing the first power-on reset procedure.

3. The method of claim 2, wherein performing the second power-on reset procedure comprising:
loading the second state from the computer memory; and
sending a power-on reset command to a power-on reset unit.

4. The method of claim 1, wherein the first power-on reset procedure clears an instruction cache of the computer processor.

5. The method of claim 1, wherein the first power-on reset procedure changes an operating frequency of the computer processor.

6. The method of claim 1, wherein the first power-on reset procedure changes a depth of an instruction cache of the computer processor.

7. The method of claim 1, wherein the predetermined sequence of hardware events is an order of hardware events that are known to harm the efficiency or speed of the computer processor.

8. The method of claim 1, wherein the predetermined sequence of hardware events is a sequence of hardware events that are known to require large amounts of memory.

9. A system for avoiding a processing flaw in a computer processor triggered by a predetermined sequence of hardware events, the system comprising:
a detecting unit to determine that the predetermined sequence of hardware events is going to occur at the computer processor;
a power-on reset unit to initialize the computer processor to a first state stored in computer memory in response to detecting the sequence of hardware events while power is maintained at the computer processor; and
an instruction cache containing computer instructions to be executed by the computer processor; and
wherein determining that the predetermined sequence of hardware events is going to occur at the computer processor includes detecting that a particular sequence of computer instructions is loaded at the instruction cache.

10. The system of claim 9, further comprising:
wherein the detecting unit is further configured to determine if the predetermined sequence of hardware events is going to occur at the computer processor after initializing the computer processor to the first state; and
wherein the power-on reset unit is further configured to initialize the computer processor to a second state stored in computer memory if the predetermined sequence of hardware events is no longer going to occur at the computer processor after initializing the computer processor to the first state, the second state being a state of the computer processor prior to initializing the computer processor to the first state.

11. The system of claim 10, wherein initializing the computer processor to the second state includes loading the second state from the computer memory.

12. The system of claim 9, wherein initializing the computer processor to the first state clears an instruction cache of the computer processor.

13. The system of claim 9, wherein initializing the computer processor to the first state changes an operating frequency of the computer processor.

14. The system of claim 9, wherein initializing the computer processor to the first state changes a depth of an instruction cache of the computer processor.

15. A computer program product for avoiding a processing flaw in a computer processor triggered by a predetermined sequence of hardware events, the computer program product comprising:
a computer readable storage medium having computer readable program code embodied therewith, the computer readable program code configured to:
detect that the predetermined sequence of hardware events is going to occur at the computer processor; and
perform a first power-on reset procedure by the computer processor such that the computer processor is initializing to a first state stored in computer memory in response to detecting the sequence of hardware events; and
check if a particular sequence of computer instructions is loaded at an instruction cache of the computer processor; and
wherein detecting that the predetermined sequence of hardware events is going to occur at the computer processor includes detecting that the particular sequence of computer instructions is going to be executed by the computer processor.

16. The computer program product of claim 15, further comprising computer readable program code to:
determine if the predetermined sequence of hardware events is going to occur at the computer processor after performing the first power-on reset procedure; and
if the predetermined sequence of hardware events is no longer going to occur at the computer processor after performing the first power-on reset procedure, perform a second power-on reset procedure such that the computer processor is initializing to a second state, the second state being a state of the computer processor prior to performing the first power-on reset procedure.

17. The computer program product of claim 16, wherein performing the second power-on reset procedure comprising:
loading the second state from the computer memory; and
sending a power-on reset command to a power-on reset unit.

18. The computer program product of claim 15, wherein the first power-on reset procedure clears an instruction cache of the computer processor.

19. The computer program product of claim 15, wherein the first power-on reset procedure changes an operating frequency of the computer processor.

20. The computer program product of claim 15, wherein the first power-on reset procedure changes a depth of an instruction cache of the computer processor.

21. The computer program product of claim 15, wherein the predetermined sequence of hardware events is an order of hardware events that are known to harm the efficiency or speed of the computer processor.

22. The computer program product of claim 15, wherein the predetermined sequence of hardware events is a sequence of hardware events that are known to require large amounts of memory.

* * * * *